US011662744B2

(12) United States Patent
Ortman et al.

(10) Patent No.: US 11,662,744 B2
(45) Date of Patent: May 30, 2023

(54) INTERACTIVE VEHICLE MOVEMENT DETERMINATION

(71) Applicant: Ford Global Technologies, LLC, Dearborn, MI (US)

(72) Inventors: Richard Ortman, Saline, MI (US); Colin Turner Lieberman, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 17/480,264

(22) Filed: Sep. 21, 2021

(65) Prior Publication Data

US 2023/0090754 A1  Mar. 23, 2023

(51) Int. Cl.
*H04W 4/02* (2018.01)
*G05D 1/02* (2020.01)
*B60S 3/00* (2006.01)
*B60S 5/00* (2006.01)
*H04W 4/40* (2018.01)

(52) U.S. Cl.
CPC ............ *G05D 1/0276* (2013.01); *B60S 3/004* (2013.01); *B60S 5/00* (2013.01); *H04W 4/025* (2013.01); *H04W 4/40* (2018.02)

(58) Field of Classification Search
CPC ....... G05D 1/0276; H04W 4/40; H04W 4/025
See application file for complete search history.

(56) References Cited

U.S. PATENT DOCUMENTS

| | | | |
|---|---|---|---|
| 8,694,235 B2 | 4/2014 | Eadie | |
| 8,862,313 B2 | 10/2014 | Brey | |
| 9,595,018 B2 | 3/2017 | Carvajal | |
| 10,146,226 B1* | 12/2018 | Salter | B61L 15/0027 |
| 10,815,080 B2 | 10/2020 | Anderson | |
| 2005/0229808 A1* | 10/2005 | MacDowell | B60S 3/004 |
| | | | 105/157.1 |
| 2020/0286384 A1* | 9/2020 | Borsos | G05D 1/0282 |
| 2021/0150922 A1* | 5/2021 | Kanagarajan | G08G 5/0026 |

FOREIGN PATENT DOCUMENTS

| | | |
|---|---|---|
| CN | 107813796 A | 3/2018 |
| DE | 202011105187 U1 | 12/2011 |
| WO | 2019120825 A1 | 6/2019 |

* cited by examiner

*Primary Examiner* — Benyam Haile
(74) *Attorney, Agent, or Firm* — Frank Lollo; Bejin Bieneman PLC

(57) ABSTRACT

A system comprises a computer having a processor and a memory, the memory storing instructions executable by the processor to transmit a vehicle localization signal from a first vehicle, receive vehicle localization data for the first vehicle, the vehicle localization data generated based on receipt of the vehicle localization signal by a plurality of localization receivers of a vehicle movement space, determine, based on the vehicle localization data for the first vehicle, a position of the first vehicle in the vehicle movement space, determine a position of a second vehicle in the vehicle movement space relative to the position of the first vehicle, and command a first movement by the first vehicle based on the position of the first vehicle and the position of the second vehicle relative to the position of the first vehicle.

18 Claims, 7 Drawing Sheets

INTERACTIVE VEHICLE MOVEMENT DETERMINATION

BACKGROUND

Various types of vehicle services can be provided in a manner involving movement of subject vehicles in a movement space during the provision of service. The appropriate movement of a particular vehicle can be dictated by factors such as timings of stages of a service procedure being performed, the geometry of the movement space, and the positions of components used in the service procedure. The presence of other vehicles in the movement space can also impose constraints upon the movement of the particular vehicle in question.

DETAILED DESCRIPTION

Disclosed herein is a system for determining movements to be performed by a vehicle while in a vehicle movement space. A localization transmitter of the vehicle transmits localization signals, which are received by various localization receivers of the vehicle movement space. Based on the reception of the localization signals by the localization receivers, the position of the vehicle within the vehicle movement space can be determined (e.g., via techniques such as time-difference-of-arrival (TDoA) and/or angle-of-arrival (AoA)). An appropriate movement for the vehicle can be determined given its position, while also taking into account the position of other vehicle(s) in the movement space relative to that vehicle. The vehicle can send signals to command movement on the part of other vehicles, and/or to actuate components of the vehicle movement space. Via this approach, vehicles can be moved more quickly and/or efficiently. Furthermore, operations can be customized on the fly to accommodate specific needs of specific vehicles.

A system can comprise a computer having a processor and a memory, the memory storing instructions executable by the processor to transmit a vehicle localization signal from a first vehicle, receive vehicle localization data for the first vehicle, the vehicle localization data generated based on receipt of the vehicle localization signal by a plurality of localization receivers of a vehicle movement space, determine, based on the vehicle localization data for the first vehicle, a position of the first vehicle in the vehicle movement space, determine a position of a second vehicle in the vehicle movement space relative to the position of the first vehicle, and command a first movement by the first vehicle based on the position of the first vehicle and the position of the second vehicle relative to the position of the first vehicle.

The memory can store instructions executable by the processor to command a second movement by the first vehicle based on a message received from the second vehicle.

The memory can store instructions executable by the processor to send a message to the second vehicle to command a movement by the second vehicle.

The vehicle localization signal can be an ultra-wide band (UWB) signal, and the plurality of localization receivers can be UWB anchors.

The memory can store instructions executable by the processor to send a signal to command an actuation of a component of the vehicle movement space.

The component can be a movable component of the vehicle movement space, and the actuation can cause the movable component to move.

The vehicle movement space can comprise space of a vehicle transport trailer, and the movable component can be a movable ramp of the vehicle transport trailer.

The component can be a cleaning component of the vehicle movement space.

A method can comprise transmitting a vehicle localization signal from a first vehicle, receiving vehicle localization data for the first vehicle, the vehicle localization data generated based on receipt of the vehicle localization signal by a plurality of localization receivers of a vehicle movement space, determining, based on the vehicle localization data for the first vehicle, a position of the first vehicle in the vehicle movement space, determine a position of a second vehicle in the vehicle movement space relative to the position of the first vehicle, and commanding a first movement by the first vehicle based on the position of the first vehicle and the position of the second vehicle relative to the position of the first vehicle.

The method can comprise commanding a second movement by the first vehicle based on a message received from the second vehicle.

The method can comprise sending a message to the second vehicle to command a movement by the second vehicle.

The vehicle localization signal can be an ultra-wide band (UWB) signal, and the plurality of localization receivers can be UWB anchors.

The vehicle movement space can comprise space of a vehicle transport trailer, and the method can comprise sending a signal to command an actuation of a movable ramp of the vehicle transport trailer.

The vehicle movement space can comprise space of a car wash, and the method can comprise sending a signal to command an actuation of a cleaning component of the car wash.

A system can comprise a first vehicle including a transmitter to transmit a vehicle localization signal, a plurality of localization receivers for a vehicle movement space, the plurality of localization receivers to receive the vehicle localization signal and generate vehicle localization data for the first vehicle based on receipt of the vehicle localization signal, and a computer having a processor and a memory, the memory storing instructions executable by the processor to determine, based on the vehicle localization data for the first vehicle, a position of the first vehicle in the vehicle movement space, determine a position of a second vehicle in the vehicle movement space relative to the position of the first vehicle, and command a first movement by the first vehicle based on the position of the first vehicle and the position of the second vehicle relative to the position of the first vehicle.

The memory can store instructions executable by the processor to command a second movement by the first vehicle based on a message received from the second vehicle.

The memory can store instructions executable by the processor to send a message to the second vehicle to command a movement by the second vehicle.

The vehicle localization signal can be an ultra-wide band (UWB) signal, and the plurality of localization receivers can be UWB anchors.

The memory can store instructions executable by the processor to send a signal to command an actuation of a component of the vehicle movement space.

The vehicle movement space can comprise space of a vehicle transport trailer, the component can be a movable ramp of the vehicle transport trailer, and the actuation can cause the movable ramp to change position.

The vehicle movement space can comprise space of a car wash, and the component can be a cleaning component of the car wash.

Figure 1:
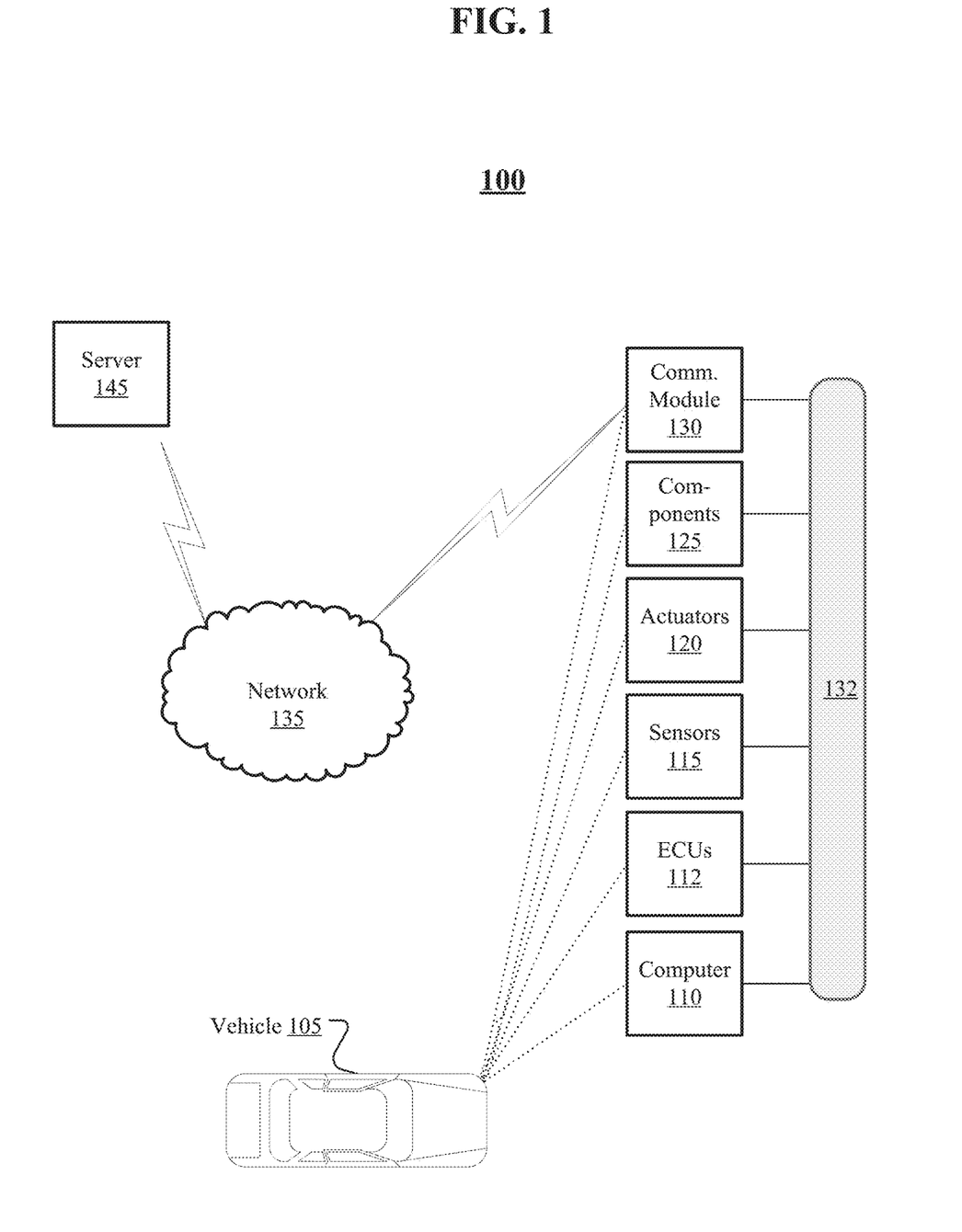
FIG. 1 is a block diagram of an example system.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as cellular V2V (CV2V), cellular V2I (CV2I), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
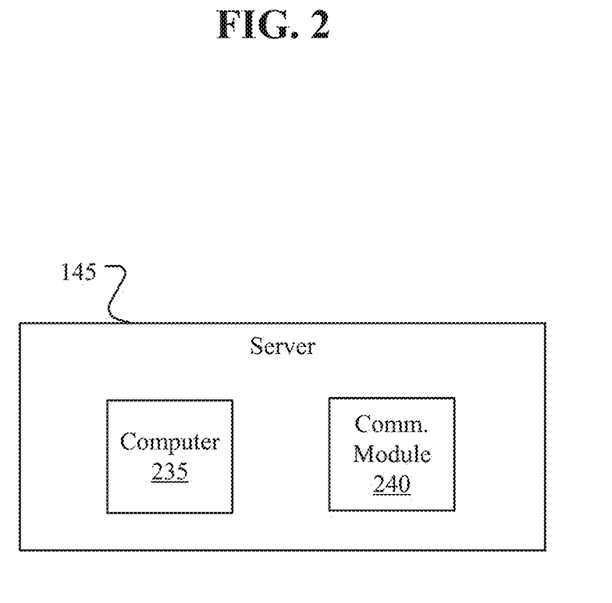
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Figure 3:
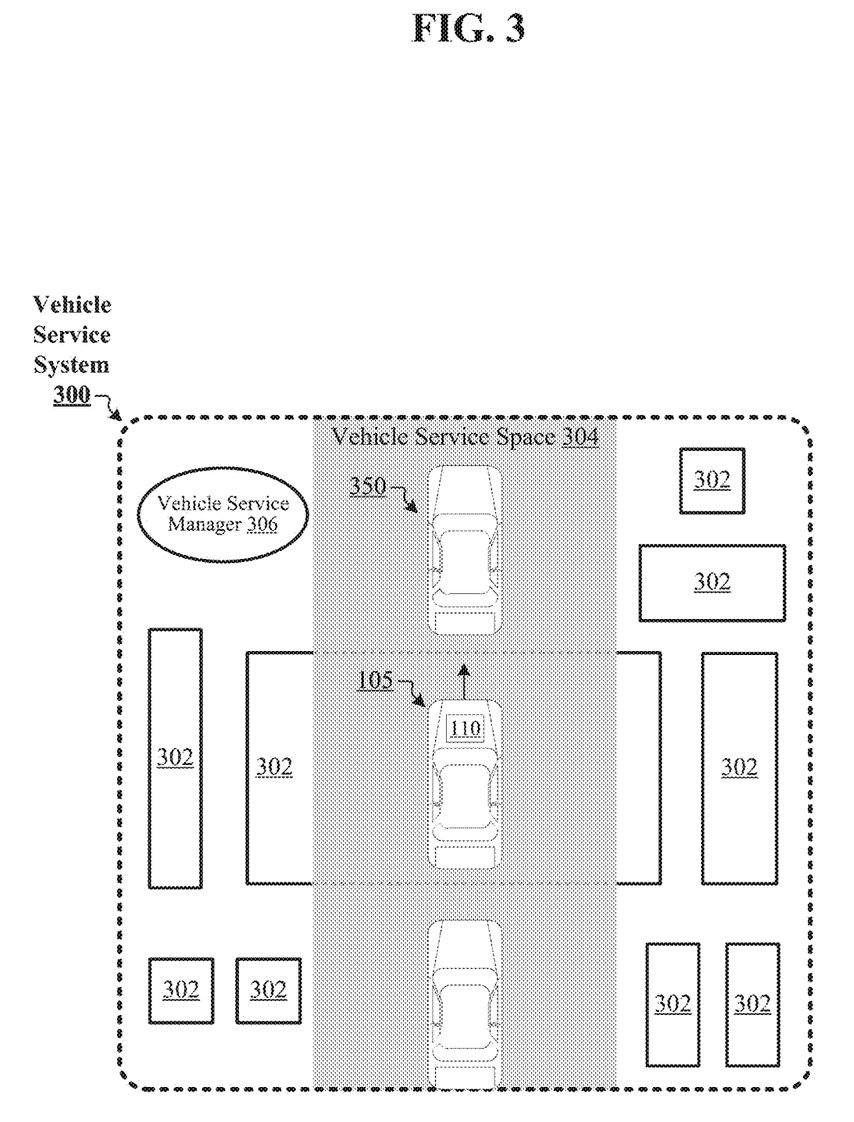
FIG. 3 is a block diagram of an example vehicle movement system.

FIG. 3 is a block diagram of an example vehicle movement system 300. Vehicle movement system 300 is a system for providing movement of vehicle(s) 105, typically in the context of a system or structure provided for one or more types of service for vehicles such as vehicle 105 of FIG. 1. Examples of service systems that could implement a vehicle movement system 300 could include, without limitation, vehicle cleaning/washing, vehicle repair, vehicle transportation, and vehicle storage. Vehicle movement system 300 includes various components 302, which are discussed in detail below in reference to FIG. 5.

Vehicle movement system 300 can control or direct movement of vehicles within a vehicle service space 304. Vehicle service space 304 is a three-dimensional space within which vehicles (e.g., vehicle 105) are located while being provided services by a system or structure that includes the vehicle movement system 300. The nature of vehicle service space 304 can vary depending on the type of service being provided. In some implementations, vehicle movement system 300 can be a car wash that provides vehicle cleaning/washing services, and vehicle service space 304 can be a space traversed by vehicles as they are cleaned/washed by vehicle movement system 300. In some implementations, vehicle movement system 300 can be a vehicle transport trailer that provides vehicle transportation services, and vehicle service space 304 can be space occupied (or occupiable) by vehicles being transported by the vehicle transport trailer.

A vehicle 105 can move within vehicle service space 304. The nature of this movement can vary depending on the type of service being provided. For example, if vehicle movement system 300 is implemented in a car wash that provides vehicle cleaning/washing services, the movement of vehicle 105 within vehicle service space 304 can take the form of forward motion along a ground or floor surface. In another example, if vehicle movement system 300 is implemented in a vehicle transport trailer that provides vehicle transportation services, the movement of vehicle 105 within vehicle service space 304 can involve motion along ramps and/or tracks (which may be movable) of the vehicle transport trailer. Such motion can include both forward and backward motion, and can include upward and downward components (e.g., motion up/down ramps).

A vehicle service manager 306 can manage the control or direction of movement by a vehicle 105. Vehicle service manager 306 can comprise programming executable on one or more computers. In some implementations, vehicle service manager 306 can be a centralized manager that manages the provision of service to multiple (e.g., all) vehicles 105 in vehicle service space 304. In some such implementations, vehicle service manager 306 can comprise programming executing on a computer (not shown in FIG. 3) of vehicle movement system 300. In some other implementations, vehicle service manager 306 can be a dedicated manager for a vehicle 105, and can manage the provision of service to a specific vehicle 105, e.g., vehicle service manager 306 can comprise programming executing on computer 110 of vehicle 105.

In some implementations, a human operator can exert control over movements of vehicle 105 using an intermediary device, such as a mobile communication device, that can communicate and coordinate with vehicle service manager 306 and vehicle 105. In some implementation, an operating can take control of vehicle 105's movement using a client application executing on an intermediary device, and can manually control movements on the part of vehicle 105 by entering commands/inputs at the intermediary device. In an example implementation in which vehicle movement system 300 is implemented in a vehicle transport trailer that provides vehicle transportation services, an operator can use a client application executing on a mobile device to manually advance/retract vehicles onto/from ramps and/or tracks of the vehicle transport trailer.

Figure 4:
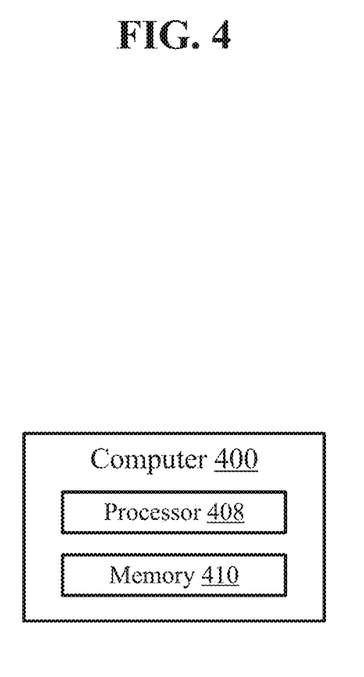
FIG. 4 is a block diagram of an example computer.

FIG. 4 is a block diagram of a computer 400 that can execute programming of vehicle service manager 306 according to some implementations. According to some implementations, computer 400 can correspond to computer 110 in vehicle 105. According to other implementations, computer 400 can correspond to a computer of vehicle movement system 300 of FIG. 3.

As shown in FIG. 4, computer 400 can include processor 408 and memory 410. Memory 410 includes one or more forms of computer-readable media, and stores instructions executable by the processor for performing various operations, including as disclosed herein. Processor 408 can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). Processor 408 also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, device 300 can include multiple processors (including processor 302), each one of which can be implemented according to any of the examples above.

Figure 5:
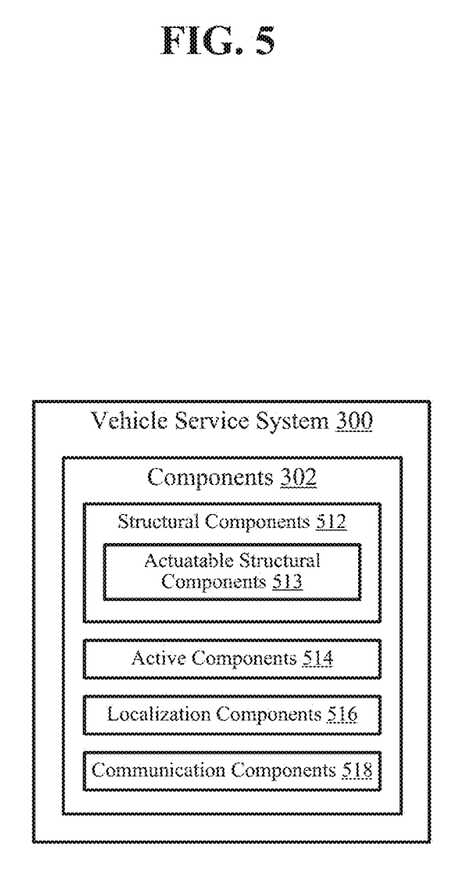
FIG. 5 illustrates additional exemplary aspects of the vehicle movement system.

FIG. 5 illustrates additional aspects of vehicle movement system 300 according to various implementations. As shown in FIG. 5, the components 302 of vehicle movement system 300 can include structural components 512, active components 514, localization components 516, and communication components 518.

Structural components 512 are elements of physical structure comprised in vehicle movement system 300. Structural components 512 can include structural elements surrounding, enclosing, spanning, underlying, or covering vehicle service space 304, such as walls, ceilings, floors, vehicle tracks, and ramps. Structural components 512 can additionally include support structures for such structural elements, such as support pillars, trusses, framing, etc. Structural components 512 can include actuatable structural components 513. Actuatable structural components 513 are structural components 512 that can be actuated to cause them to move. For instance, in some implementations in which vehicle movement system 300 is a vehicle transport trailer, actuatable structural components 513 can include movable vehicle ramps.

Active components 514 are non-structural components that can, when actuated, perform functions associated with the provision of services to vehicles in vehicle service space 304. In some implementations, active components 514 can include a cleaning component. For instance, in some implementations in which vehicle movement system 300 is a car wash, active components 514 can include a cleaning component that sprays water, soap, or wax on vehicles in the car wash, or scrubs, rinses, dries (e.g., by blowing hot air or otherwise applying heat, or by wiping water from the vehicle), polishes, or buffs vehicles in the car wash. Some active components 514 can move in conjunction with performing their associated functions. For instance, an active component 514 can be a rotating drum scrubber that rotates as it scrubs a vehicle in vehicle service space 304, and can be mounted on a pivoting support arm that pivots to move the rotating drum scrubber into the proper position for scrubbing when it is actuated.

Localization components 516 are components that transmit and/or receive signals for localization of vehicles in vehicle service space 304. In some implementations, localization components 516 can include components supporting ultra-wide band (UWB) localization, such as UWB anchors and/or UWB tags. In some implementations, localization components 516 can alternatively or additionally include components supporting other localization technologies, such as Bluetooth or Bluetooth Low Energy (LE) localization. In some implementations, the localization of vehicles in vehicle service space 304 can be conducted using two-way ranging. In some implementations, time-difference-of-arrival (TDoA) and/or angle-of-arrival (AoA) methodologies can be applied in conjunction with the localization of vehicles in vehicles service space 304.

Communication components 518 are components that transmit and/or receive messages to/from vehicles in vehicle service space 304. Communication components 518 can include one or more radio frequency (RF) transmitters, receivers, and/or transceivers, and can transmit and/or receive messages according to any suitable wireless communication protocol(s), such as Bluetooth, Bluetooth Low Energy (BLE), IEEE 802.11/WiFi, wireless wide area network (WWAN)/cellular protocols such as 3GPP cellular radio access network protocols, vehicle-to-vehicle (V2V) such as cellular V2V (CV2V), cellular V2I (CV2I), etc.).

Returning to FIG. 3, in some implementations, vehicle 105 can transmit (e.g., by a localization transmitter of vehicle 105) a vehicle localization signal, which can be received by various vehicle localization receivers of vehicle movement system 300. Based on the receipt of the vehicle localization signal, vehicle service manager 306 can determine a position of vehicle 105 in vehicle service space 304. This determination can be performed using, for example, two-way ranging, TDoA, and/or AoA techniques.

A position, relative to vehicle 105, of another vehicle 350 in vehicle service space 304 can be sensed. In some implementations, this sensing can be conducted via transmission and reception of vehicle localization signals and/or same or similar methodologies as the determination of the position of vehicle 105 in vehicle service space 304. For instance, localization receivers in vehicle 350 can receive the localization signal transmitted by vehicle 105, and vehicle 350 determine its position relative to vehicle 105 and send data to vehicle 105 to report that relative position. In some implementations, the sensing of the position of vehicle 350 relative to vehicle 105 can be accomplished via a different procedure, such as, for example, by analysis of radar returns and captured image data provided by radar sensors and camera(s), respectively, of vehicle 105.

Based on the position of vehicle 105 in vehicle service space 304 and the position of vehicle 350 relative to vehicle 105, a movement on the part of vehicle 105 can be commanded. For instance, in some implementations in which vehicle movement system is a car wash, vehicle 105 can be commanded to move into a "rinse area" of the car wash based on a determination that vehicle 105 is positioned at the threshold of the rinse area and a leading vehicle (e.g., vehicle 350) has departed the rinse area.

In some implementations, vehicle 105 can communicate with other vehicles (e.g., vehicle 350) in vehicle service space 304 in conjunction with determining/controlling its motion (and/or the motion of other vehicles) in vehicle service space 304. In some implementations, for instance, computer 110 of vehicle 105 may command a movement of vehicle 105 based on a message received from another vehicle such as vehicle 350. In an example implementation in which vehicle movement system 300 is a car wash, computer 110 may command vehicle 105 to move forward into a rinse area responsive to receipt of a message from vehicle 350 indicating that vehicle 350 has departed the rinse area.

In some implementations, a first vehicle 105 may send a message to a second vehicle (e.g., vehicle 350) in vehicle service space 304 to command a movement by the second vehicle. For instance, in an example implementation in which vehicle movement system 300 is a vehicle transport trailer, vehicle 105 may identify its destination as a position behind vehicle 350 on a particular track/level of the vehicle transport trailer. Based on a determination that vehicle 350 is not positioned far forward enough to enable vehicle 105 to position itself appropriately (e.g., in proper alignment with restraining features needed to secure vehicle 105 to the trailer during transport), vehicle 105 can send a message to vehicle 350 to command vehicle 350 to move forward.

In some implementations, vehicle 105 can communicate with vehicle service manager 306 to command an actuation of a component of vehicle movement system 300. In an example implementation in which vehicle movement system 300 is a vehicle transport trailer, vehicle 105 can send a message to vehicle service manager 306 to command actuation of a movable ramp of the vehicle transport trailer (e.g., to enable vehicle 105 to move to a desired position). In an example implementation in which vehicle movement system 300 is a car wash, vehicle 105 can send a message to vehicle service manager 306 to command actuation of a component for scrubbing, rinsing, drying, polishing, or buffing, or for applying water, soap, or wax.

Figure 6:
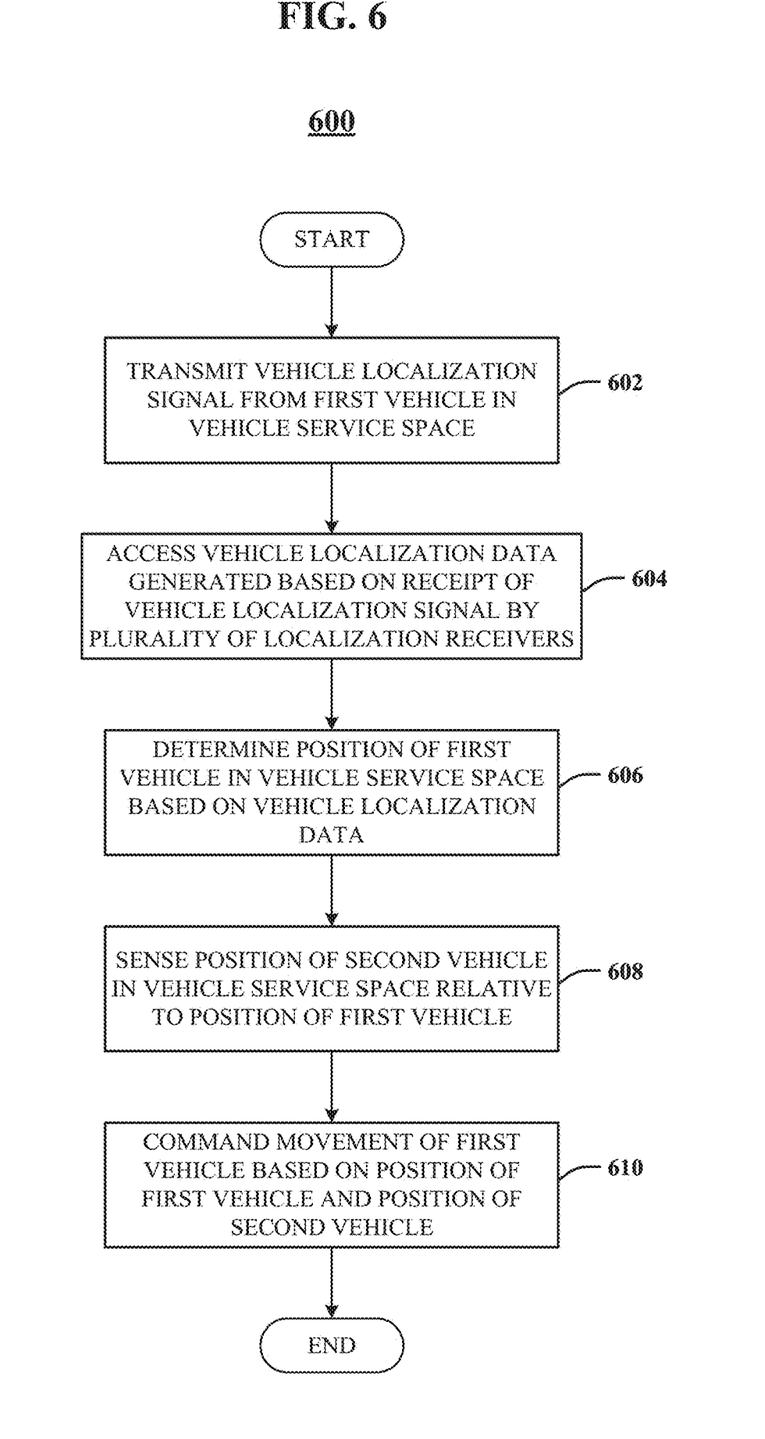
FIG. 6 is a block diagram of an example process flow.

FIG. 6 is a block diagram of a process flow 600, which may be representative of operations executed in various implementations. As shown in process flow 600, a vehicle localization signal may be transmitted from a first vehicle in a vehicle service space of a vehicle movement system at 602. For example, a localization transmitter of vehicle 105 may transmit a vehicle localization signal while vehicle 105 is in vehicle service space 304 of FIG. 3. At 604, vehicle localization data may be accessed that is generated based on receipt, by a plurality of localization receivers of the vehicle movement system, of the vehicle localization signal transmitted at 602. For example, computer 110 of vehicle 105 may access vehicle localization data generated based on receipt, by a plurality of localization receivers of vehicle movement system 300, of a vehicle localization signal transmitted from vehicle 105.

At 606, a position of the first vehicle in the vehicle service space may be determined based on the vehicle localization data accessed at 604. For example, computer 110 of vehicle 105 may determine a position of vehicle 105 within vehicle service space 304 of vehicle movement system 300 based on vehicle localization data accessed at 604. At 608, a position of a second vehicle within the vehicle service space relative to the position of the first vehicle may be determined. For example, a position of vehicle 350 relative to vehicle 105 in vehicle service space 304 of FIG. 3 may be determined. At 610, a movement of the first vehicle may be commanded based on the position of the first vehicle within the vehicle service space and the position of the second vehicle relative to the position of the first vehicle. For example, computer 110 may command a movement of vehicle 105 based on the position of vehicle 105 within vehicle service space 304 and the position of vehicle 350 relative to the position of vehicle 105.

Figure 7:
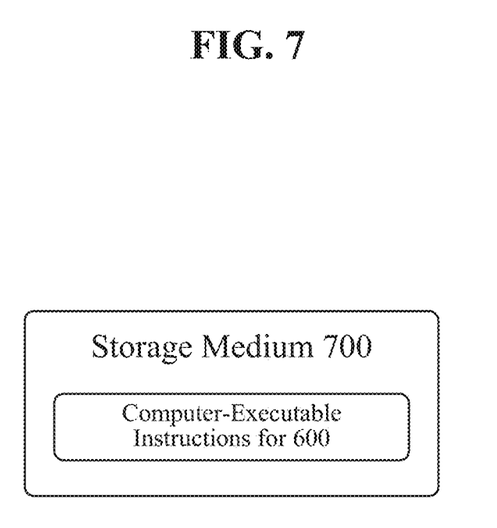
FIG. 7 is a block diagram of an example storage medium.

FIG. 7 illustrates an example storage medium 700. Storage medium 700 may be any non-transitory computer-readable storage medium or machine-readable storage medium, such as an optical, magnetic or semiconductor storage medium. In various implementations, storage medium 700 may be an article of manufacture. In some implementations, storage medium 700 may store computer-executable instructions, such as computer-executable instructions to implement process flow 600. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
   a computer for a first vehicle having a processor and a memory, the memory storing instructions executable by the processor to:
   transmit a vehicle localization signal from the first vehicle;
   receive vehicle localization data for the first vehicle, the vehicle localization data being based on receipt of the vehicle localization signal by a plurality of localization receivers of a vehicle movement space;
   determine, based on the vehicle localization data for the first vehicle, a position of the first vehicle in the vehicle movement space;
   determine a position of a second vehicle in the vehicle movement space relative to the position of the first vehicle;
   command a first movement by the first vehicle based on the position of the first vehicle and the position of the second vehicle relative to the position of the first vehicle; and
   send a signal from the first vehicle to command an actuation of a component of the vehicle movement space.

2. The system of claim 1, the memory storing instructions executable by the processor to command a second movement by the first vehicle based on a message received from the second vehicle.

3. The system of claim 1, the memory storing instructions executable by the processor to send a message to the second vehicle to command a movement by the second vehicle.

4. The system of claim 1, where the vehicle localization signal is an ultra-wide band (UWB) signal and the plurality of localization receivers are UWB anchors.

5. The system of claim 1, wherein the actuation causes the movable component to move.

6. The system of claim 5, where the vehicle movement space comprises space of a vehicle transport trailer and the movable component is a movable ramp of the vehicle transport trailer.

7. The system of claim 1, where the component is a cleaning component of the vehicle movement space.

8. A method, comprising:
   transmitting a vehicle localization signal from a first vehicle;
   receiving vehicle localization data for the first vehicle, the vehicle localization data being based on receipt of the vehicle localization signal by a plurality of localization receivers of a vehicle movement space;
   determining, based on the vehicle localization data for the first vehicle, a position of the first vehicle in the vehicle movement space;
   determining a position of a second vehicle in the vehicle movement space relative to the position of the first vehicle;
   commanding a first movement by the first vehicle based on the position of the first vehicle and the position of the second vehicle relative to the position of the first vehicle; and
   sending a signal from the first vehicle to command an actuation of a component of the vehicle movement space.

9. The method of claim 8, comprising commanding a second movement by the first vehicle based on a message received from the second vehicle.

10. The method of claim 8, comprising sending a message to the second vehicle to command a movement by the second vehicle.

11. The method of claim 8, where the vehicle localization signal is an ultra-wide band (UWB) signal and the plurality of localization receivers are UWB anchors.

12. The method of claim 8, where the vehicle movement space comprises space of a vehicle transport trailer, the method comprising sending a signal to command an actuation of a movable ramp of the vehicle transport trailer.

13. A system, comprising:
   a first vehicle including a transmitter to transmit a vehicle localization signal;
   a plurality of localization receivers for a vehicle movement space, the plurality of localization receivers to receive the vehicle localization signal and generate vehicle localization data for the first vehicle based on receipt of the vehicle localization signal; and
   a computer for the first vehicle having a processor and a memory, the memory storing instructions executable by the processor to:
   determine, based on the vehicle localization data for the first vehicle, a position of the first vehicle in the vehicle movement space;

determine a position of a second vehicle in the vehicle movement space relative to the position of the first vehicle;

command a first movement by the first vehicle based on the position of the first vehicle and the position of the second vehicle relative to the position of the first vehicle; and send a signal from the first vehicle to command an actuation of a component of the vehicle movement space.

14. The system of claim 13, the memory storing instructions executable by the processor to command a second movement by the first vehicle based on a message received from the second vehicle.

15. The system of claim 14, where the vehicle movement space comprises space of a vehicle transport trailer, the component is a movable ramp of the vehicle transport trailer, and the actuation causes the movable ramp to change position.

16. The system of claim 14, where the vehicle movement space comprises space of a car wash and the component is a cleaning component of the car wash.

17. The system of claim 13, the memory storing instructions executable by the processor to send a message to the second vehicle to command a movement by the second vehicle.

18. The system of claim 13, where the vehicle localization signal is an ultra-wide band (UWB) signal and the plurality of localization receivers are UWB anchors.

* * * * *